United States Patent
Muise et al.

Patent Number: 5,919,504
Date of Patent: Jul. 6, 1999

[54] FRESH PRODUCE PACKAGE

[75] Inventors: Herbert D. Muise, Tumwater; Robert H. Young, Tacoma; James J. Nussbaum, Maple Valley, all of Wash.

[73] Assignee: Weyerhaeuser Company, Tacoma, Wash.

[21] Appl. No.: 09/060,037

[22] Filed: Apr. 13, 1998

[51] Int. Cl.$^6$ .............................. A23B 7/00; B65B 55/00
[52] U.S. Cl. .................. 426/106; 426/118; 426/407; 426/415; 426/419; 383/103
[58] Field of Search ................. 426/106, 407, 426/415, 118, 419; 383/103

[56] References Cited

U.S. PATENT DOCUMENTS

| | | | |
|---|---|---|---|
| H9 | 1/1986 | Ashmore | 206/497 |
| 5,130,152 | 7/1992 | Alameda | 426/106 |
| 5,171,593 | 12/1992 | Doyle | 426/106 |
| 5,375,929 | 12/1994 | Bergmoser | 383/38 |
| 5,402,906 | 4/1995 | Brown et al. | 220/403 |
| 5,427,808 | 6/1995 | Adams | 426/419 |
| 5,458,899 | 10/1995 | Floyd et al. | 426/404 |
| 5,492,705 | 2/1996 | Porchia et al. | 426/106 |
| 5,565,230 | 10/1996 | Bailey | 426/411 |
| 5,698,249 | 12/1997 | Hayashi et al. | 426/106 |

FOREIGN PATENT DOCUMENTS 0829484   5/1981   U.S.S.R. .

*Primary Examiner*—Nina Bhat

[57] ABSTRACT

The invention is a produce bag that permits fumigation of the contained product but effectively prevents product moisture loss. The bag is perforated on one major surface only, the other surface being left imperforate. The perforations on the other surface provide from 0.35–2.0% open area on this surface. Perforations are preferably in the range of 0.12–0.18 inches in diameter and 50 or more are typically needed. When filled with produce, a single layer of filled bags is placed in a corrugated shipping container. The imperforate surface of the bag is placed downward in contact with the shipping container to prevents moisture loss to the container.

8 Claims, 1 Drawing Sheet

FRESH PRODUCE PACKAGE

The present invention is directed to a produce bag having controlled venting to maintain freshness and to the method of packaging. The bag is particularly efficient at retaining moisture while freely permitting fumigation.

The miracle of modern transportation and storage systems has made fresh fruit and produce of the highest quality available year around. Even delicate off-season produce such as raspberries and strawberries find their way from growers in South America to tables in the United States still in prime condition. Apples and pears are crisp and juicy six to nine months after they were picked. In part this is due to controlled atmosphere storage in which the oxygen level is reduced and carbon dioxide level is elevated. Periodic fumigation to prevent botrytis growth is routinely required for highly perishable products. This need, in turn, dictates the type of packaging used.

If table grapes might be used as an example, these are usually field packaged in approximately 2 pound (0.9 kg) bags. Most usually six to twelve bags are then placed in a single layer in a corrugated shipping container. The containers have side perforations to permit fumigation while in storage. Sulfur dioxide is the usual fumigant and treatment is typically on a weekly basis while in storage.

Two requirements must be met in the packaging. It must be tight enough so that product moisture is retained yet open enough so that fumigant can freely enter. These would appear to be almost mutually exclusive requirements and to the present time no generally satisfactory solution has been found.

One type of packaging employs complex film enclosures having differinging permeability to various gases. Bailey, U.S. Pat. No. 5,565,230, might be exemplary of this approach. Porchia et al., U.S. Pat. No. 5,492,705, describe a bag having a multiplicity of microperforations which allows the product to breathe so that localized condensation and weight loss are minimized. Both of these patents have extensive references in their background section to prior efforts.

However, bags with overall perforations have not proved satisfactory for many products. If the perforations of a bag are in contact with the kraft paper surface of a corrugated shipping container, severe moisture loss of the contents will occur. The paper acts as a highly efficient desiccant to withdraw moisture from the product in the bag. To again use table grapes as an example, moisture loss before they appear on the grocer's shelves must be less than about 2%, otherwise browning and deterioration will occur.

The present invention has solved the problem of product moisture retention while retaining accessibility to gaseous fumigants during storage periods.

SUMMARY OF THE INVENTION

The present invention is directed to a container for fresh produce and to the method of using the product within a shipping container. The container is in the form of a bag having the sides and bottom sealed and an open top. While a flat bag is contemplated as the preferred embodiment, a bag with gusseted sides would also be suitable. The bag has opposing first and second major surfaces. The first surface is imperforate while the second surface has a multiplicity of small perforations. The area of the perforations will constitute from about 0.35% to 2.0% of the area of the second surface; i.e. the second surface will have about 0.35–2.0% open area. A preferred range is from about 0.4–1.0% open area on the second surface.

In a typical produce bag at least about 50 perforations will be present and these will have a diameter ranging between 0.1 to 0.2 inches (2.5–5.0 mm). A preferred hole size is between about 0.12–0.18 inches (3.0–4.6 mm) in diameter. Holes of about ⅛ inch (3.2 mm) have proved to be very satisfactory.

The perforations may be uniformly patterned over the second surface. However, for reasons to soon be described, it is preferred that at least a majority of the perforations should be located above a transverse midline located between the top and bottom edges.

Material from which the container is made is not critical. Plastic films having carefully regulated gas transmission rates are not necessary. Polyolefin films are preferred; e.g., low density polyethylene, but other commonly used packaging films are also very suitable.

In use, the bags are filled with the produce being packaged and the open end is loosely rolled to make a casual closure, casual being defined here as unsealed. The filled bags are then placed in a single layer in a corrugated shipping container with the perforated surface upward. The imperforate surface of the bag is downward against the inner surface of the shipping container. Used in this manner, the bag protects against moisture loss of the contents to the paper. The shipping container has perforations in the sides to allow the entry of the fumigant gas. It is sized so that the top of the container, when closed, is not in significant contact with the packages of produce.

It is an object of the invention to provide an improved package for fresh produce.

It is a further object to provide fresh produce packaging that protects against moisture loss yet provides access to gaseous fumigants.

These and many other objects will become readily apparent upon reading the following detailed description taken in conjunction with the drawings.

DETAILED DESCRIPTION OF THE PREFERRED EMBODIMENT

Figure 1:
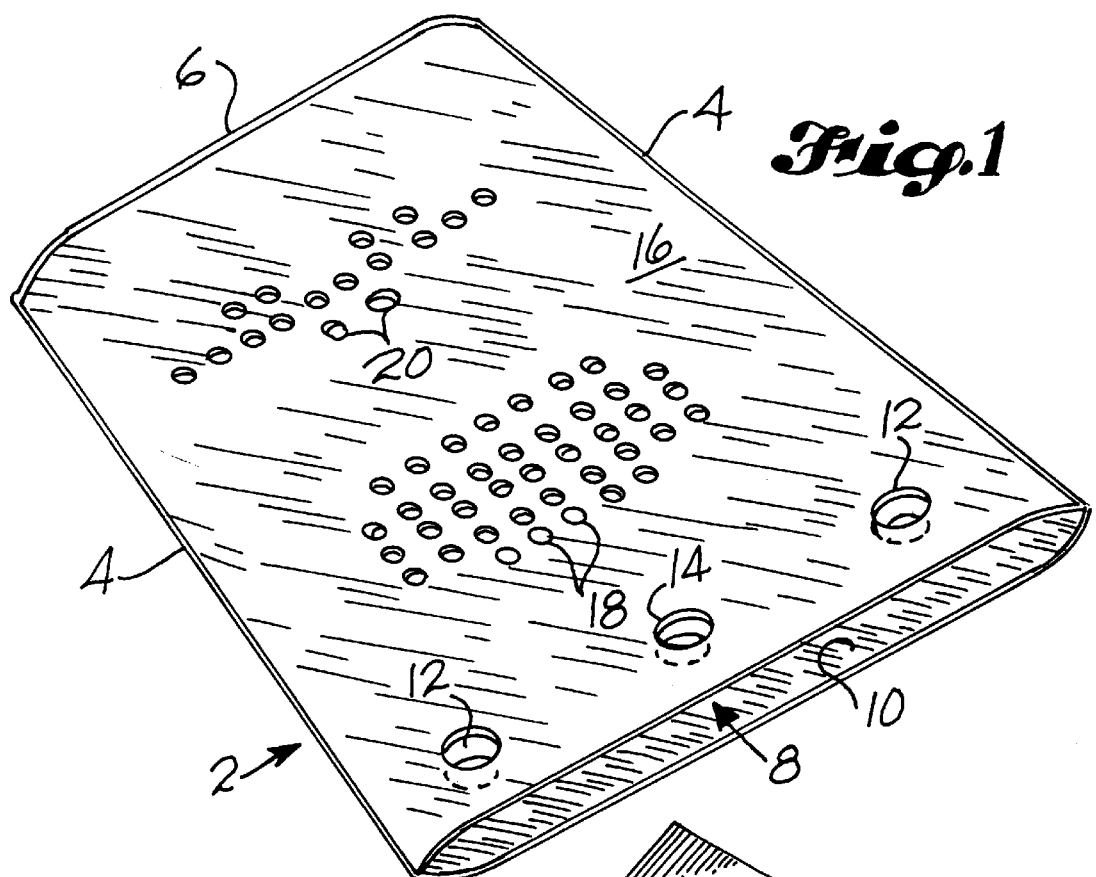
FIG. 1 is a perspective view of the improved produce bag.

The invention can be readily understood by reference to the drawings. The bag, generally shown at 2, has sealed edges 4 and a sealed bottom 6. The upper end 8 is left open. A first or lower surface 10 is left imperforate except holes for 12 and 14 near the upper end. Holes 8 serve to hang the bag while it is being filled and hole 10 is a finger hole to pull the bag open to enable rapid filling. The upper surface 16 of the bag contains a multiplicity of small holes or apertures 18, 20. These may be uniformly distributed over the upper surface 16 or arranged in two ranks as shown on FIG. 1. It is preferred that the majority of the perforations should be located above a transverse midline between the upper and lower edges.

The overall shape of the bag is not critical. It may be rectangular or it may be trapezoidal as is shown in the figure. If the contained product is table grapes, a trapezoidal bag is advantageous. A bunch of grapes is much wider at the proximal or stem end than at the other end and the trapezoidal shape more readily accommodates this configuration.

While, as was noted, the arrangement of holes 18, 20 is not critical, a patterned arrangement is advantageous for some produce. Again, using table grapes as an example, these are usually packed in the field and on initial cooling there may be some initial condensation in the bag. This usually occurs at or near the bottom of the package. Free water in the package is undesirable since it encourages fungus growth. The lower rank of holes 20 serves to vent any condensed moisture.

Figure 2:
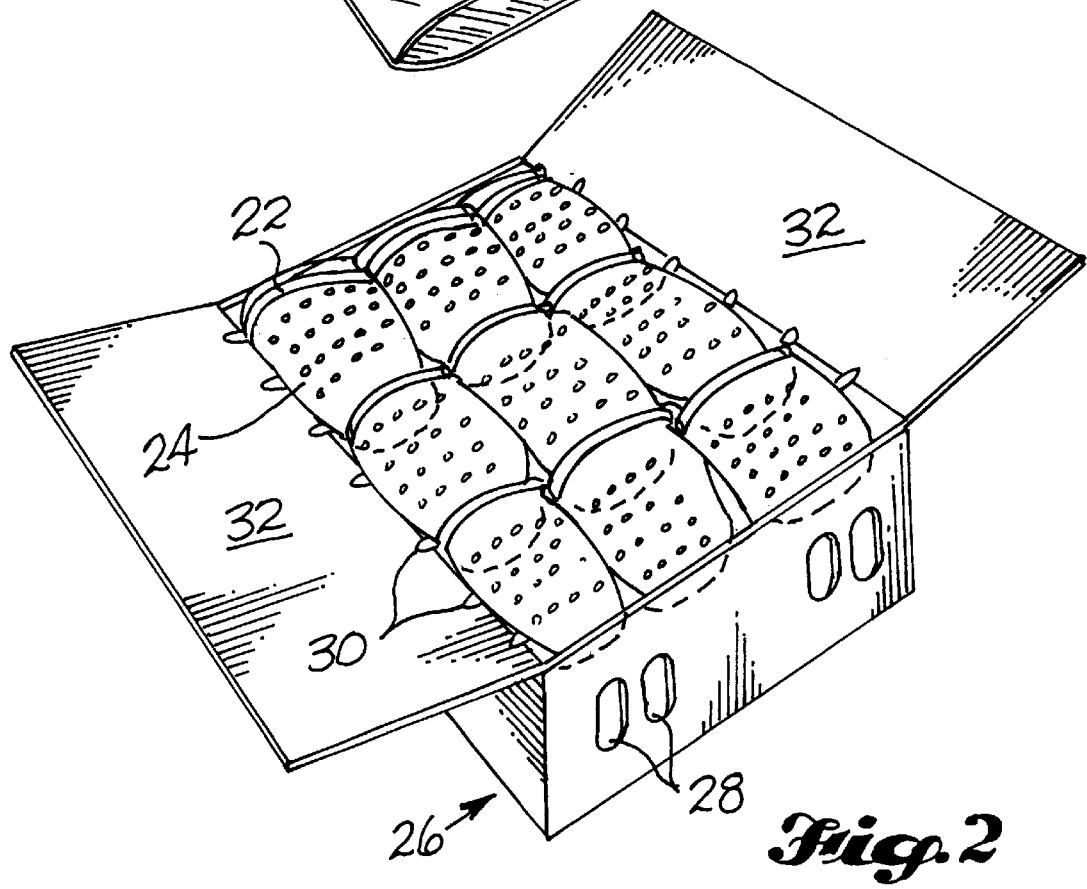
FIG. 2 is a view of the filled bags placed in a corrugated shipping container ready for closure.

Referring now to FIG. 2, after filling, the upper end 8 of the bag is loosely rolled to form a casual closure 22. The filled bag 24 is then placed in a shipping container, generally indicated at 26. The container has punched apertures 28, 30 whish serve to admit fumigating gas. Upper flaps 32 close the box when filled. However, these do not contact the filled bags 24 to any significant extent. The filled bags are placed in the box in a single layer and may be somewhat overlapping in shingle fashion, with those at the far end being laid in first. The apertured second surface 16 is upward while imperforate surface 8 lies against the inside bottom surface of shipping container 26. While some holes 20 in the lower rank in the bag may be covered by an adjacent bag, sufficient remain open to serve their purpose of venting any condensation. The majority of the holes 18 are open to allow introduction of a fumigant gas.

Rather than a small number of larger holes, it has been found that a multiplicity of small perforations are necessary for effective diffusion of fumigant gas into the filled bags. For an equal amount of open area, the diffusion rate with thirty small perforations is almost 10 times as great as when only two or three holes having the same amount of area are used.

EXAMPLE

A bag holding an average of about 2 pounds of table grapes was made from low density polyethylene film having the following dimensions: length 13.1 inches (332 mm), width at the open upper end 12.1 inches (308 mm), and width at the sealed lower end 6.1 inches (154 mm). An upper ply of the bag was perforated with 70-⅛ inch (3.2 mm) diameter holes as will be described and a lower ply was left imperforate except for three service holes which were punched through both plies. Two service holes, each 1 inch (25 mm) in diameter, were punched below the upper edge for hanging while filling and a centered hole 0.6 inches (15 mm) diameter, located between these, was placed to assist the field worker in opening the bag for filling.

The upper rank of ventilation holes comprised 54 holes arranged in 5 rows. From the top down, the rows contained respectively 8, 12, 12, 12, and 10 holes on 0.65 inch (15 mm) centers, the rows being 0.5 inches (12.7 mm) apart and the upper row being located 4.0 inches (101.6 mm) from the upper edge of the bag. All of these holes were on or above a transverse line midway between the upper and lower edges of the bag. The lower rank of holes had 16 holes in three rows. The upper row had 2, the next 10, and the lowest had 4 holes. These were of equal size and general spacing to the upper rank. Total open area of the ventilation holes was 0.72% of the upper ply of the bag.

Bags of the type described above were packed with about 2 lb of table grapes and nine bags were placed in single layers in corrugated shipping containers. These were held in a cooler at 35° F. (1.7° C.) and 90% R.H. for six weeks. Moisture loss from the contained product was only about 0.5% over this time period and quality remained excellent. Weekly fumigation with sulfur dioxide permitted at least 150 ppm dosage into the bags. Moisture loss using conventional bags was 2.0%.

It will be apparent to those skilled in the art that many minor modifications not specifically disclosed herein could be made in the bag and packaging method described. These should be regarded as being within the scope of the invention if encompassed within the following claims.

I claim:

1. A container for fresh produce which comprises a bag having peripheral bottom, side, and top edges and opposing first and second surfaces, the bottom and both side edges being sealed and the top edge being open for introduction of the produce;

the first surface of the bag being imperforate, the second surface having a multiplicity of perforations so that the open area defined by the perforations falls within the range of about 0.35–2.0% of the second surface area, the perforations having diameters within the range of 0.1–0.2 inches (2.5–5.0 mm).

2. The container of claim 1 in which the open area is within the range of about 0.4–1.0% of the second surface area.

3. The container of claim 1 in which the bag is a polyolefin film.

4. The container of claim 1 in which the perforations are about 0.12–0.18 inches (3.0–4.6 mm) in diameter.

5. The container of claim 1 which has at least 50 perforations on the second side.

6. The container of claim 1 in which a majority of the perforations are located above a transverse midline between the top and bottom edges.

7. A method of packaging fresh produce which comprises:

providing a corrugated shipping container;

further providing a plurality of individual fresh produce bags, the bags each having peripheral bottom, side, and top edges and opposing first and second surfaces, the bottom and both side edges being sealed and the top edge being open for introduction of the produce, the first surface of the bag being imperforate, the second surface having a multiplicity of perforations so that the open area defined by the perforations falls within the range of about 0.35–2.0% of the second surface area, the perforations having diameters within the range of 0.1–0.2 inches (2.5–5.0 mm);

filling the bag with the produce to be packaged;

making a casual closure of the open end of the bag;

placing the produce filled bags as a single layer in the shipping container, the bag being placed with the perforated surface upward and the imperforate surface downward against the inside bottom of the shipping container, whereby the perforations of the individual bags permit access of a fumigating gas but the open area of the perforations is low enough to effectively retain moisture in the packaged product.

8. The method of claim 7 in which the bags are placed in overlapping shingled fashion in the shipping container.

* * * * *